(12) United States Patent
Abe et al.

(10) Patent No.: US 6,692,276 B1
(45) Date of Patent: Feb. 17, 2004

(54) CARD CONNECTOR

(75) Inventors: Kiyoshi Abe, Tokyo (JP); Eiji Matsuda, Sakura (JP)

(73) Assignee: Yamaichi Electronics Co., Ltd., Tokyo (JP)

( * ) Notice: Subject to any disclaimer, the term of this patent is extended or adjusted under 35 U.S.C. 154(b) by 0 days.

(21) Appl. No.: 09/889,007

(22) PCT Filed: Nov. 2, 2000

(86) PCT No.: PCT/JP00/07761

§ 371 (c)(1),
(2), (4) Date: Oct. 29, 2001

(87) PCT Pub. No.: WO01/35332

PCT Pub. Date: May 17, 2001

(30) Foreign Application Priority Data

Nov. 8, 1999 (JP) .......................................... 11-317508

(51) Int. Cl.⁷ .............................................. H01R 29/00
(52) U.S. Cl. ...................................... 439/188; 439/489
(58) Field of Search ................... 439/188, 489, 439/630, 607–610, 108, 101; 235/441

(56) References Cited

U.S. PATENT DOCUMENTS

| 3,283,107 A | 11/1966 | Anson | |
|---|---|---|---|
| 5,820,391 A | 10/1998 | Delprete et al. | ............... 439/91 |
| 5,911,587 A * | 6/1999 | Vermeersch | ................ 439/188 |
| 6,004,155 A | 12/1999 | Wu | ............................. 439/489 |
| 6,015,311 A * | 1/2000 | Benjamin et al. | ........... 439/188 |
| 6,039,599 A | 3/2000 | Benjamin et al. | |
| 6,059,592 A | 5/2000 | Inadama | |
| 6,073,853 A | 6/2000 | Odic | |
| 6,099,335 A * | 8/2000 | Chang | ......................... 439/188 |
| 6,126,464 A | 10/2000 | Chang | ......................... 439/188 |
| 6,129,571 A | 10/2000 | Ikemoto | |
| 6,399,906 B1 | 6/2002 | Sato et al. | |

FOREIGN PATENT DOCUMENTS

| EP | 0 284 431 | 9/1988 |
|---|---|---|
| EP | 0 669 590 A2 | 8/1995 |
| EP | 0 908 981 A2 | 4/1999 |
| JP | 5-96941 | 12/1993 |
| JP | 8-166906 | 6/1996 |
| JP | 08166906 A | 6/1996 |
| JP | 10144422 | 5/1998 |
| JP | 10-187896 | 7/1998 |
| JP | 10-255012 | 9/1998 |
| JP | 10255910 A | 9/1998 |
| JP | 11149956 | 6/1999 |
| WO | WO 01 35331 | 5/2001 |
| WO | WO 2001/35331 | 5/2001 |

* cited by examiner

Primary Examiner—Gary Paumen
(74) Attorney, Agent, or Firm—Finnegan, Henderson, Farabow, Garrett & Dunner, LLP

(57) ABSTRACT

One of each pair of metal pieces 70, 80 making up each of the switches SW1, SW2 is formed in the metal upper housing 30 to reduce the number of parts of the switches arranged in the connector and to efficiently arrange these switches in a small space.

5 Claims, 7 Drawing Sheets

CARD CONNECTOR

TECHNICAL FIELD

The present invention relates to a card connector for connecting an IC card to an electronic device, such as a cellular phone, a telephone, a PDA (personal digital assistant), a portable audio device and a camera etc., and more specifically to a structure of various switches installed in the connector.

BACKGROUND ART

In electronic devices such as cellular phones, telephones, PDAs and digital cameras, a variety of functions are added by inserting an IC card with a built-in memory or control ICs, such as a SIM (subscriber identity module), an MMC (multimedia card), a Smart Media (tradename) and an SD (super density or secure digital) card.

In a connector structure for removably accommodating such an IC card, a plurality of contact terminals made from a metal leaf spring are provided in a connector housing to make contact with a plurality of contact pads formed on the front or back surface of the inserted IC card to electrically connect the IC card to the electronic device mounting that connector. The contact pads of the IC card include a power supply pad connected to a power supply line and a plurality of signal pads for transferring various signals. These contact pads are connected via the contact terminals of the card connector to a power supply circuit and various signal processing circuits in the electronic device.

The IC card of this kind normally employs some means for prohibiting writing operations in order to protect information stored in its internal memory. One such means is a write protect button that can slide between two positions, as in a floppy disk. In such a slide button system, the card is provided with a write protect button that can slide between two positions and which, when it is situated at one position, sets the card to a write-disable state and, when it is slid to the other position, sets it to a write-enable state. On the connector side, a detector needs to be provided that detects the slide positions of the write protect button.

Further, in addition to the slide position signal of the write protect button, the electronic device often calls for a signal indicating whether the card is inserted or not. Hence, the connector should also be provided with a detector for checking the card insertion.

As a sensor structure for detecting a variety of these states, a light-based sensor structure may be conceived. The light-based sensor structure, however, has drawbacks that a sufficient detection precision cannot be expected as the card becomes thinner and smaller and that the installation of a light sensor can be a hindrance to reductions in size and cost. Hence, a sensor structure utilizing engagement and disengagement of a contact leaf spring is considered the most promising structure overall.

When these detectors are to be constructed of contact leaf springs, because each detector requires a pair of contact leaf springs, the total number of contact leaf springs and contact leaf spring support structures required in the connector as a whole is two times the number of detectors.

Such a construction therefore has a large number of parts making up the detectors and requires a large space to accommodate these parts, which is detrimental to reducing the weight, thickness and size of the connector structure.

The present invention has been accomplished under these circumstances. It is an object of the present invention to solve the above-described problems by providing a card connector which can construct one or more switches in the connector with a reduced number of parts and accommodate these switches in a smaller space efficiently.

DISCLOSURE OF THE INVENTION

According to one aspect of the present invention, a card connector is provided, which comprises: a connector housing having a lower housing and a metal upper housing; contact terminals arranged to engage external contacts of a card inserted into the connector housing; and one or more switches each operated by an engagement and disengagement of a pair of metal pieces; wherein one of the each pair of metal pieces making up each of the switches is formed in the metal upper housing.

In this invention, one of each pair of metal pieces making up each of the switches is formed in the metal cover body made from a worked metal sheet. This construction can reduce the number of parts of the switches and also the space of the connector.

BEST MODE FOR CARRYING OUT THE INVENTION

Now, embodiments of the present invention will be described in detail with reference to the accompanying drawings.

Figure 1:
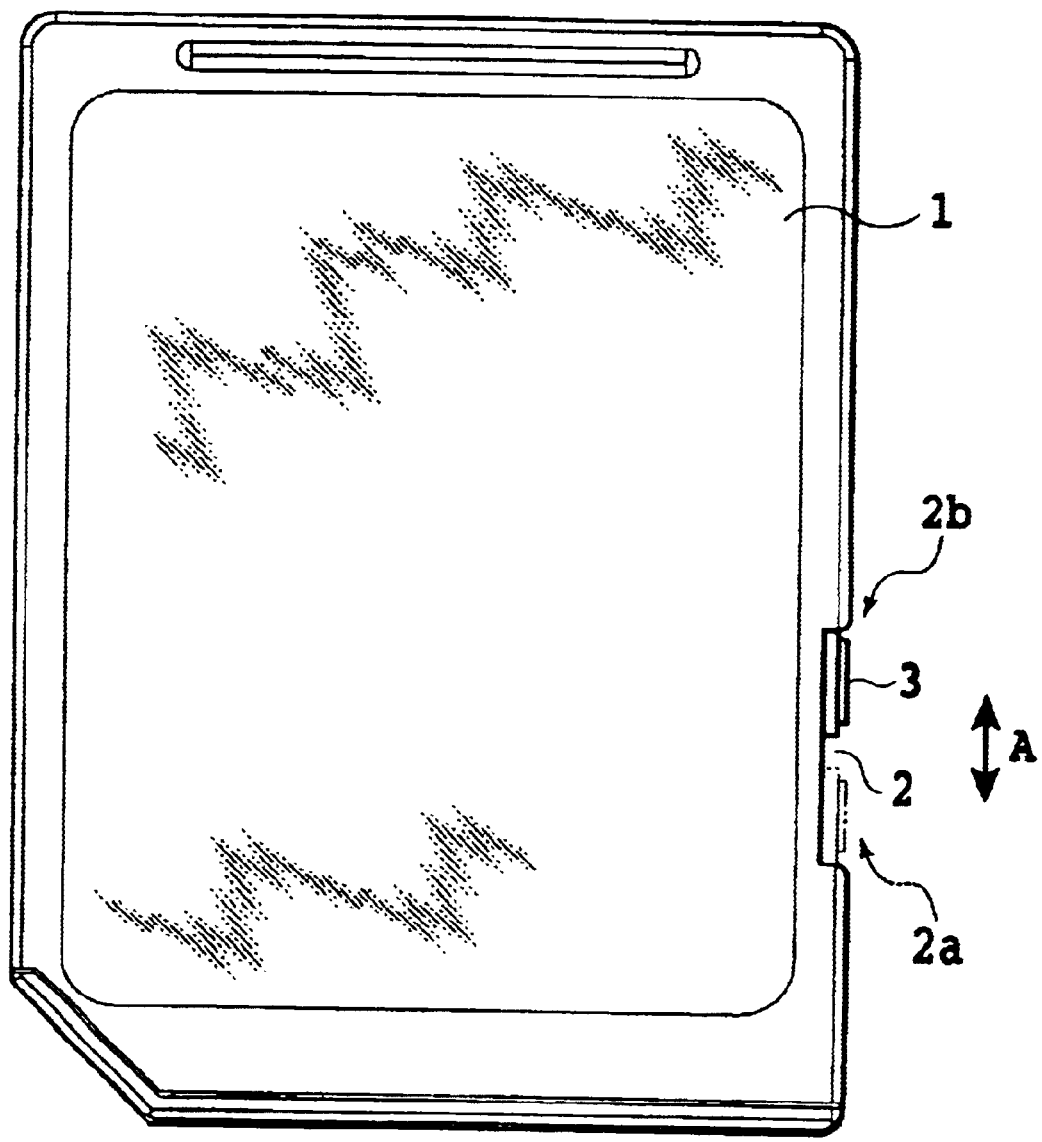
FIG. 1 is a plan view showing an example of an IC card for insertion into a card connector of this invention.

FIG. 1 is a plan view showing an example of an IC card to be inserted into the card connector of this invention.

The IC card 1 has a recess 2 formed in its side surface in which a write protect button 3 can be slid in the card insertion/retraction direction (direction of arrow A). In this case, the write protect button 3 can assume either of two positions, a protect-off (write-enable) position indicated by a solid line and a protect-on (write-disable) position indicated by a dashed line, and can be slid between these two positions. That is, the card 1 is write-enabled when the write protect button 3 is set to a rear part 2b of the recess 2 and write-disabled when the bottom 3 is set to a front part 2a of the recess 2. Though not shown in FIG. 1, the back surface of the card 1 is formed with a plurality of contact pads, including power supply pads and signal pads, which come into contact with the contact terminals on the connector side.

Figure 2:
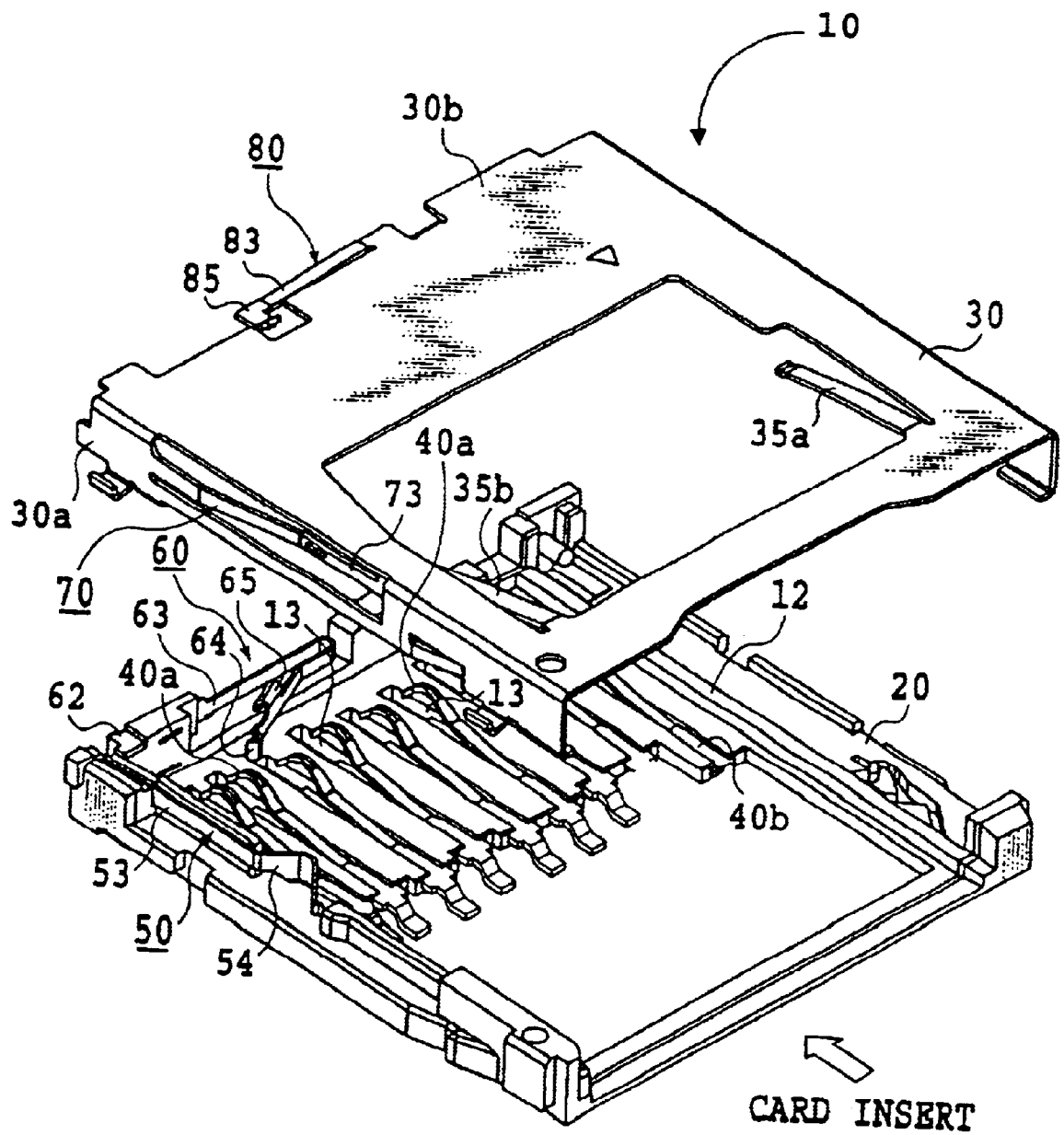
FIG. 2 is an exploded perspective view showing an outline construction of one embodiment of the card connector according to the invention.
Figure 3:
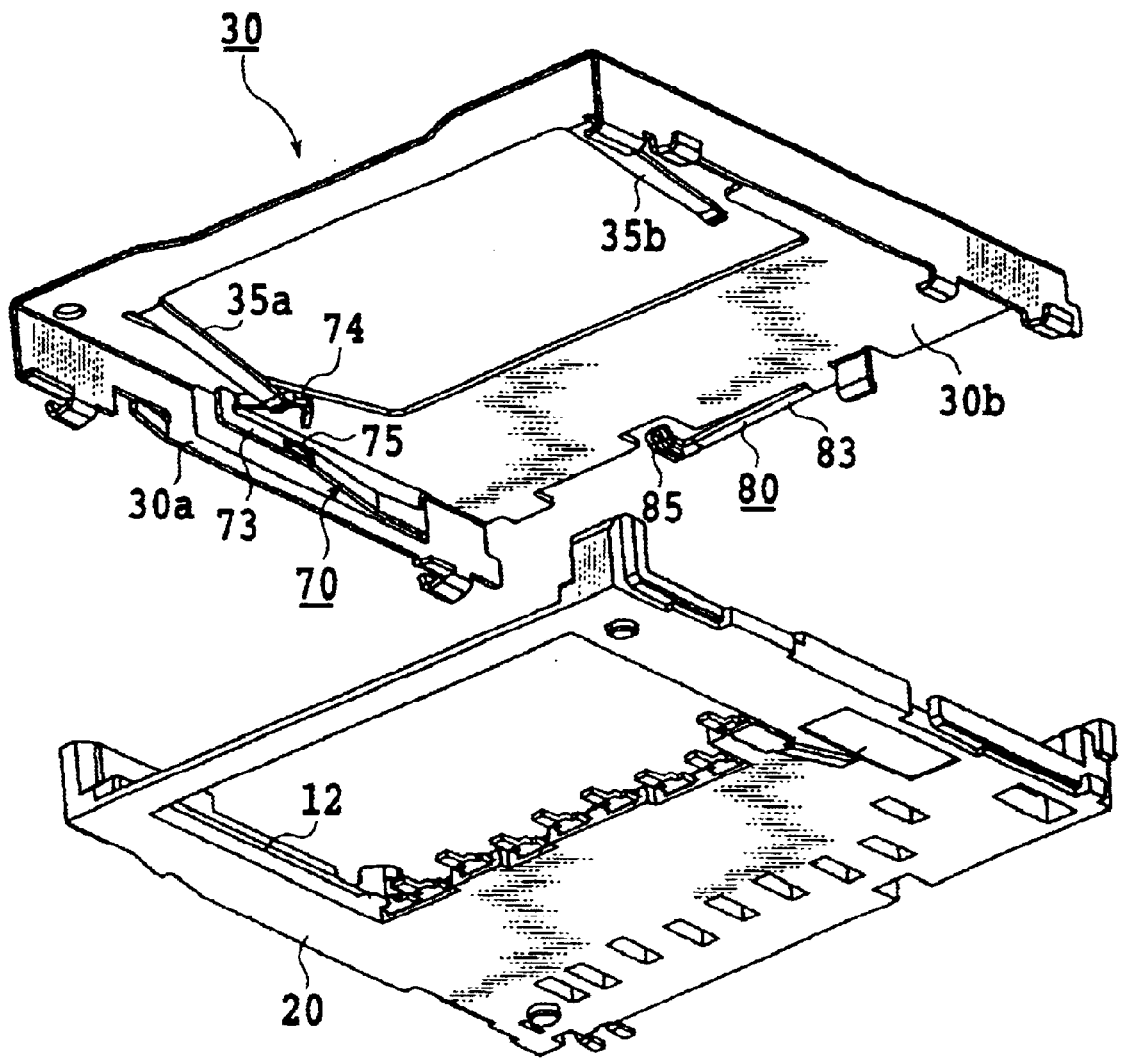
FIG. 3 is an exploded perspective view showing an outline construction of the embodiment of the card connector according to the invention.
Figure 4:
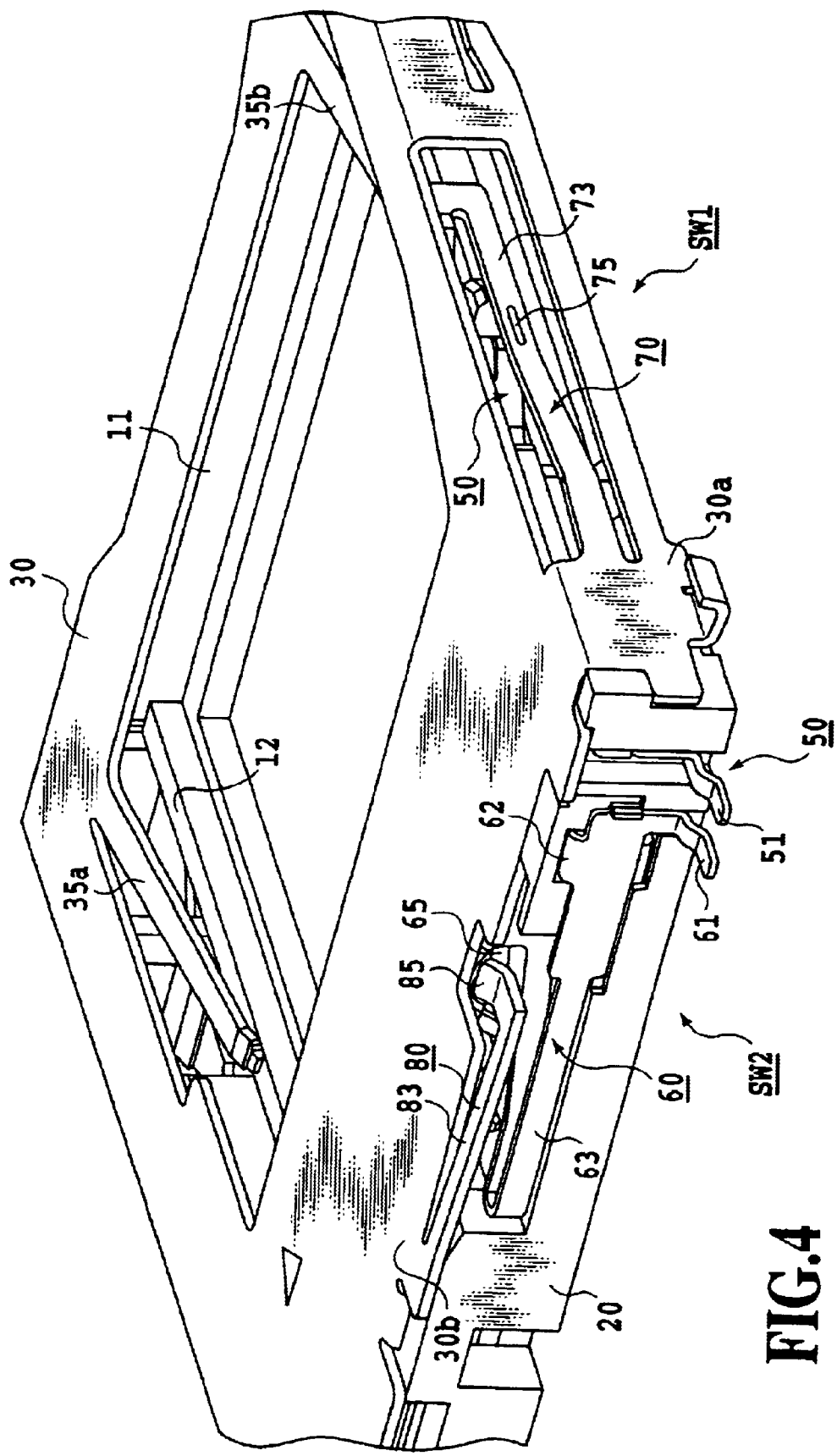
FIG. 4 is an exploded perspective view showing an outline construction of the embodiment of the card connector according to the invention.

FIG. 2 and FIG. 3 show the outline structure of the connector 10 that receives the IC card 1. FIG. 4 is a perspective view of the connector 10 as viewed diagonally from behind. The connector 10 is secured to an appropriate location on an electronic device, such as a cellular phone, a telephone, a PDA, a portable audio device and a camera.

In FIG. 2 to FIG. 4, the connector 10 has a lower housing 20 and an upper housing (upper cover body) 30. The lower housing 20 is made from an insulating material such as resin. The upper housing 30 is made from a worked metal sheet and functions as a cover body covering the lower housing 20. The reason why the upper housing 30 is made from a metal sheet, not resin, is that the metal has a greater strength than the resin and thus can reduce the height of the connector.

The connector 10 has a card insertion opening 11 at the front through which the card 1 is inserted. Both inner side surfaces of the lower housing 20 are formed with guide rails 12 that guide the card 1 as it is inserted or retracted.

A base plate of the lower housing 20 is formed with a plurality of grooves 13 in which a plurality of contact terminals 40 made from cantilevered contact leaf springs are positioned and press-fitted under pressure, respectively. The contact terminals 40 are used as power supply terminals and signal terminals. The contact terminals 40 each have at their front ends a contact portion 40a projecting in an arc and adapted to contact associated one of the plurality of contact pads formed on the card 1. Terminal portions 40b of the contact terminals 40 are soldered to contact pads of a printed circuit board of the electronic device.

A metal contact leaf spring 50 forming one of contacts of a write protect switch SW1 and a metal contact leaf spring 60 forming one of contacts of a card recognition switch SW2 are secured to the lower housing 20 by means of a press fit or a pin.

The metal upper housing 30 has a pair of leaf springs 35a, 35b facing the guide rails 12 to firmly hold the inserted card 1.

One bent side plate 30a of the metal upper housing 30 is formed with a metal leaf spring 70 that constitutes the other contact of the write protect switch SW1.

On the other hand, a top plate 30b of the upper housing 30 has a metal leaf spring 80 formed on the rear end side thereof which constitutes the other contact of the card recognition switch SW2.

Figure 5:
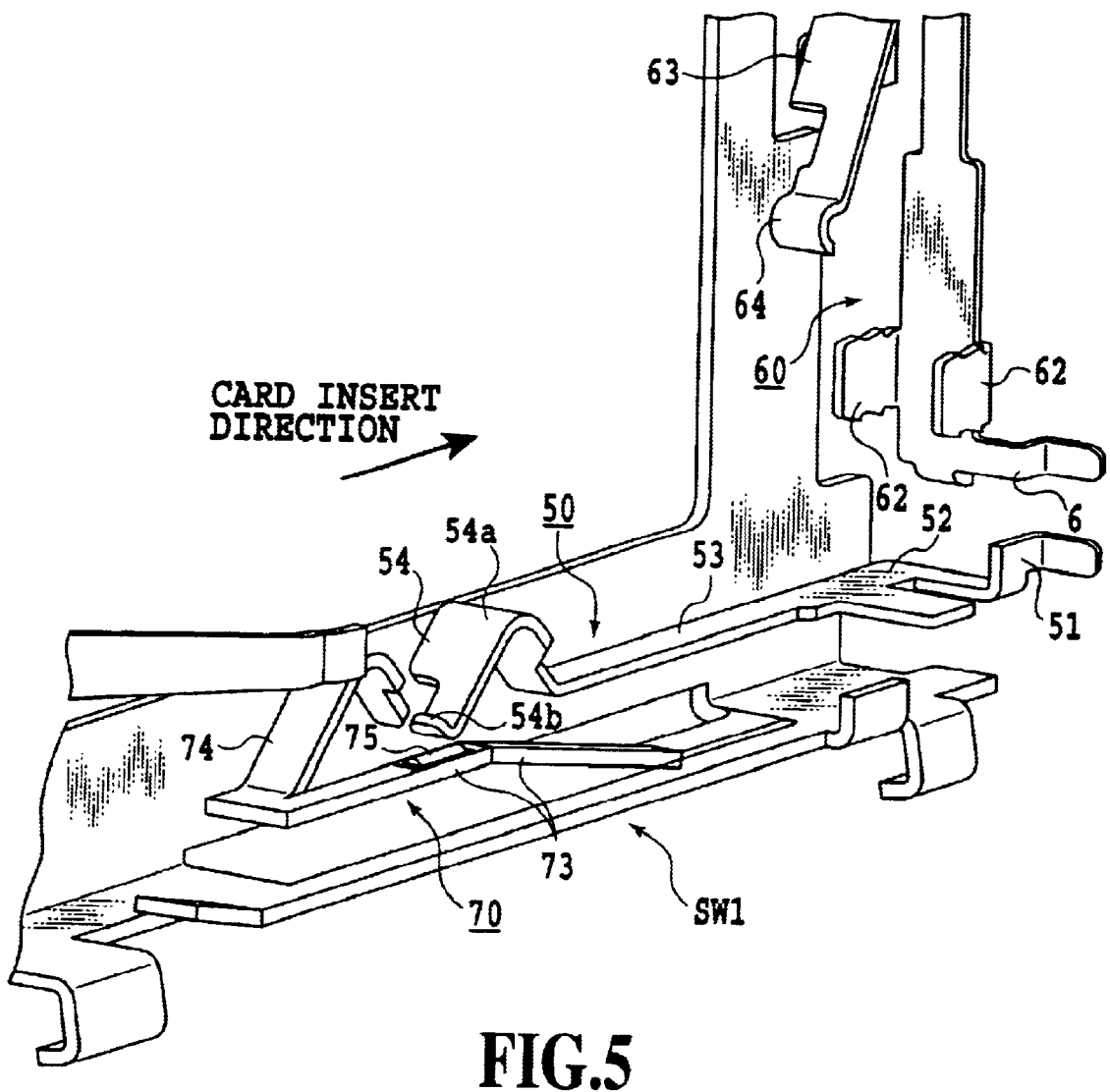
FIG. 5 is an enlarged perspective view showing an embodiment of a switch structure on a write protect switch side.

First, the write protect switch SW1 made up of the contact leaf spring 50 secured to the lower housing 20 and the contact leaf spring 70 formed in the metal upper housing 30 will be explained by referring to FIGS. 5, 6A and 6B also. The write protect switch SW1 detects the slide position of the write protect button 3 of the inserted card 1.

The contact leaf spring 50 secured to the lower housing 20 is made from a metal piece which comprises a terminal portion 51 secured to the contact pad of a the printed circuit board, a stationary portion 52 secured to the lower housing 20, a leaf spring portion 53 extending along the card side surface, and a front engagement portion 54 projecting in an arc. With the stationary portion 52 rigidly fixed, the contact leaf spring 50 is supported like a cantilevered beam. The front engagement portion 54, as shown in FIGS. 6A and 6B, has an engagement portion 54a and a front contact portion 54b at the front end of the engagement portion 54a. The engagement portion 54a engages with the front part 2a of the recess 2 formed in the card 1 or the write protect button 3 slid to the front part 2a when the card 1 is inserted. The contact leaf spring 50 has its leaf spring portion 53 urged so that when the card 1 is inserted, the engagement portion 54a is pressed against the bottom surface of the front part 2a of the recess 2 of the card 1.

The contact leaf spring 70 extending from the side plate 30a of the metal upper housing 30 is made from a metal piece which has a leaf spring portion 73 and a front engagement portion 74 projecting in an arc. The contact leaf spring 70 also has a contact projection 75 in the leaf spring portion 73 that contacts the front contact portion 54b of the contact leaf spring 50. As shown in FIG. 6A and FIG. 6B, the front engagement portion 74 engages with the rear part 2b of the recess 2 of the card 1 or the write protect button 3 slid to the rear part 2b when the card 1 is inserted. The contact leaf spring 70 has its leaf spring portion 73 urged so that when the card 1 is inserted, the front engagement portion 74 is pressed against the bottom surface of the rear part 2b of the recess 2 of the card 1.

In the switch SW1 described above, the metal upper housing 30 is electrically connected to the ground of the printed circuit board. The terminal portion 51 of the contact leaf spring 50 secured to the lower housing 20 is applied an appropriate voltage.

Figure 6A:
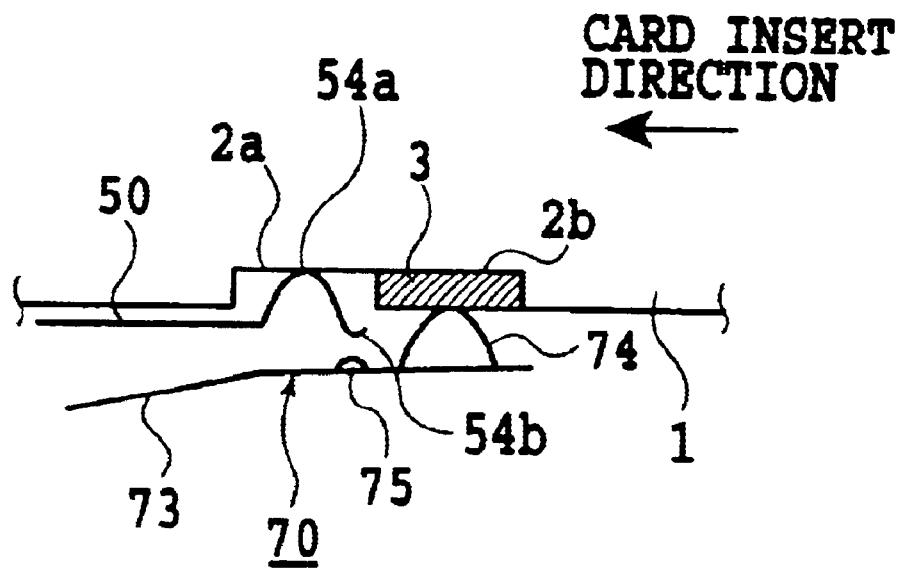
FIG. 6A and FIG. 6B are schematic diagrams showing the operation of the write protect switch.

In this switch SW1, when the write protect button 3 of the inserted card 1 is set at the write-enable position, as shown in FIG. 6A, the engagement portion 54a of the contact leaf spring 50 engages with the bottom surface of the front part 2a of the recess 2 of the card 1 and the front engagement portion 74 of the contact leaf spring 70 engages with the write protect button 3 of the card 1. At this time, the two contact leaf springs 50, 70 are separated from each other in any part and the write protect switch SW1 is off.

Figure 6B:
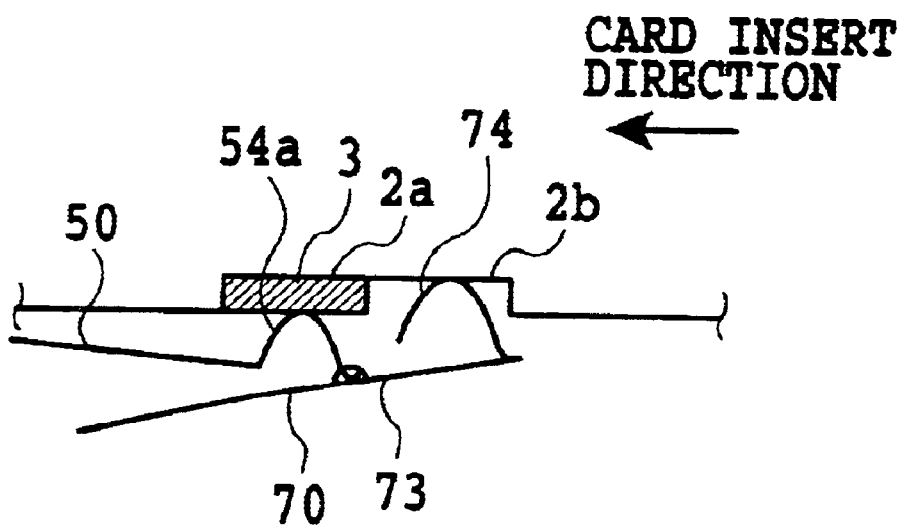

When on the other hand the write protection button 3 is set at the write-disable position, as shown in FIG. 6B, the engagement portion 54a of the contact leaf spring 50 engages with the write protect button 3 situated at the front part 2a of the recess 2 of the card 1 and the front engagement portion 74 of the contact leaf spring 70 engages with the bottom surface of the rear part 2b of the recess 2 of the card 1. At this time, the two contact leaf springs 50, 70 are in contact with each other through the front contact portion 54b and the contact projection 75 and the write protection switch SW1 is on.

In the write protect switch SW1 made up of the two contact leaf springs 50, 70, these contact leaf springs 50, 70 are brought into or out of contact with each other according to the position of the write protect button 3. Thus, electrically detecting the engagement or disengagement between the contact leaf springs 50, 70 can determine at which of the write-disable/write-enable positions the write protect button 3 of the IC card 1 is situated.

In this structure of the switch SW1, at whichever of the two slide positions the write protect button 3 is situated, the engagement portion of one contact leaf spring engages with the write protect button 3 and the engagement portion of the other contact leaf spring engages with a part of the recess 2 adjacent to the write protect button. Hence, if there is a play due to differences between the width of the card accommodating portion of the connector 10 and the width of the card 1, or parts tolerances or assembly tolerances, the shift in the position of the write protect button 3 can always cause the contact leaf springs 50, 70 to be displaced by a distance equal to the height of the write protect button 3.

In this structure of the switch SW1, because the write protect button 3 and the part of the recess 2 adjacent to the bottom 3 are used to bring the contact leaf springs 50, 70 into or out of contact with each other, the directions of displacements of the contact leaf springs 50, 70 are opposite. For example, when the state changes from the one shown in FIG. 6A where the contact leaf springs 50, 70 are separated to the one shown in FIG. 6B where the contact leaf springs 50, 70 abut each other, the contact leaf springs 50, 70 move toward each other until they engage. The shift from the state of FIG. 6B to the state of FIG. 6A is reverse to the process above and the contact leaf springs 50, 70 move away from each other until they are parted.

As described above, because the structure of the switch SW1 can engage or disengage the two contact leaf springs 50, 70 through their relative displacement equal to two times the height of the write protect button 3, this switch structure is effectively applied to a small card which cannot keep a sufficient height for the write protect button.

Figure 7:
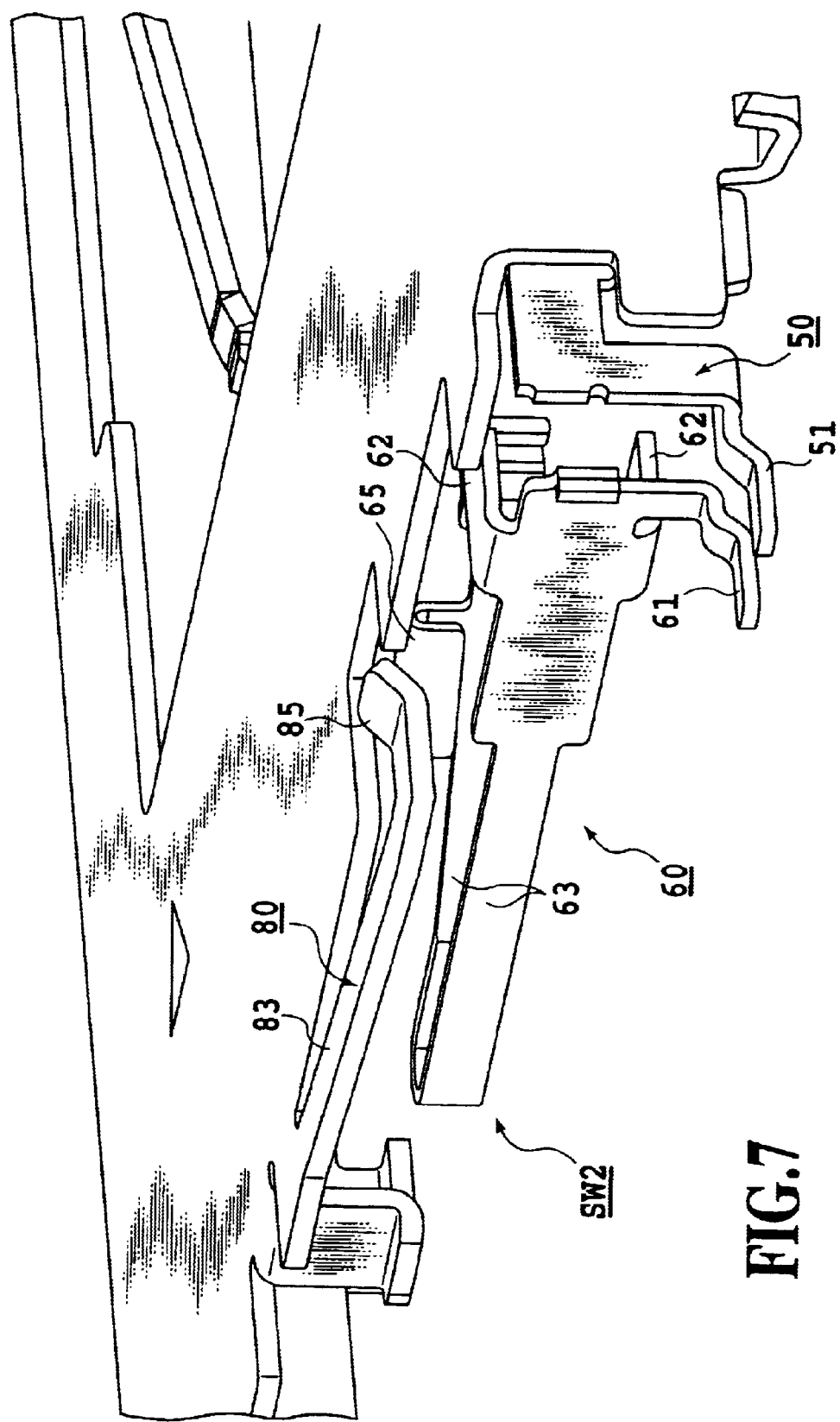
FIG. 7 is an enlarged perspective view showing an embodiment of a switch structure on a card recognition switch side.

Next, the card recognition switch SW2 made up of the contact leaf spring 60 secured to the lower housing 20 and the contact leaf spring 80 formed in the metal upper housing 30 will be described by referring also to FIG. 7. The card recognition switch SW2 detects whether or not the card 1 is fully inserted into the connector 10.

The contact leaf spring 60 secured to the lower housing 20 comprises a terminal portion 61 fixedly connected to the contact pad of the printed circuit board, a grip portion 62 for gripping the top and bottom portions of the lower housing 20 to securely hold the contact leaf spring 60, a folded leaf spring portion 63, an engagement portion 64 protruding to engage with the front end face of the inserted card 1, and a folded contact portion 65 projecting upward from the leaf spring portion 63.

On the other hand, the contact leaf spring 80 formed at the rear end portion of the upper housing 30 is made from a metal piece having a leaf spring portion 83 and a front end contact portion 85.

In this switch SW2, the metal upper housing 30 is electrically connected to the ground of the printed circuit board, as described earlier. The terminal portion 61 of the contact leaf spring 60 secured to the lower housing 20 is applied an appropriate voltage.

In this card recognition switch SW2 made up of these two contact leaf springs 60, 80, when the card 1 is not inserted, the contact leaf springs 60, 80 have their contact portions 65, 85 separated, leaving the card recognition switch SW2 turned off.

When the card 1 is fully inserted into the connector 10, the engagement portion 64 of the contact leaf spring 60 is pushed by the front end face of the card 1, displacing the contact portion 65 rearwardly. As a result, the contact portion 65 of the contact leaf spring 60 and the front end contact portion 85 of the contact leaf spring 80 engage with each other, turning on the card recognition switch SW2.

In this embodiment, because the metal upper housing 30 as the upper cover of the connector housing is formed with one of paired metal pieces forming the write protect switch SW1 and with one of paired metal pieces forming the card recognition switch SW2, it is possible to reduce the number of parts of the switches and simplify the structure for holding the metal pieces, which in turn lead to reduced cost and space.

In the above embodiment, while the button position indicated by a solid line in FIG. 1 corresponds to the write-enable position and the position indicated by a dashed line corresponds to the write-disable position, the positional relation may be reversed, i.e., the button position indicated by the solid line in FIG. 1 may correspond to the write-disable position and the position indicated by the dashed line may correspond to the write-enable position.

In the above embodiment, although the contact leaf spring 60 is of a folded type, it may use the same type of leaf spring as other contact leaf springs 50, 70. Further, the leaf springs 50–80 may have any other desired shape as long as various states, such as the protect button position and the presence or absence of an inserted card, are detected by utilizing the elastic engagement or disengagement between these leaf springs.

Although the above embodiment uses two switches in detecting the protect button position and the presence or absence of an inserted card, if additional switches are necessary to detect other states, one of the paired metal pieces making up each of the additional switches need only be formed in the metal upper housing 30.

Industrial Applicability

As described above, because in this invention the metal upper housing as the upper cover of the connector housing is formed with one of the paired contact pieces making up each of one or more switches, it is possible to reduce the number of parts of the switches and simplify the structure for holding the contact pieces, leading to reduced cost and space.

What is claimed is:

1. A card connector comprising:
   a connector housing having a lower housing and a metal upper housing;
   contact terminals arranged on the connector housing to engage with contact pads of an inserted card; and
   one or more switches each operated by engagement and disengagement of a pair of metal pieces;
   wherein at least one of said one or more switches comprises:
   a first contact leaf spring formed on said connector housing, said first contact leaf spring having an engagement portion for engaging with a button of said inserted card when the button is in a first position;
   a second contact leaf spring having an engagement portion for engaging with said button of said inserted card when the button is in a second position; and
   a contact portion provided on at least one of said first contact leaf spring and said second contact leaf spring for electrically connecting said first contact leaf spring to said second contact leaf spring when said button of said inserted card is located in one of the first position and the second position.

2. A card connector according to claim 1, wherein each of said first contact leaf spring and said second contact leaf spring is a contact leaf spring extending from an end portion of said connector housing like a cantilevered beam.

3. A card connector according to claim 1, wherein when one of said one or more switches is a card recognition switch to detect the presence or absence of the inserted card, one metal piece of said pair of metal pieces making up said card recognition switch is formed as a portion of said metal upper housing.

4. A card connector according to claim 1, wherein said inserted card has a slidable write protect button at a side surface thereof and said first contact leaf spring and said second contact leaf spring each are a write protect switch configured to detect a slide position of the write protect button of said inserted card.

5. A card connector according to claim 1 or 2, wherein one of said first contact leaf spring and said second contact leaf spring is formed as a portion of said metal upper housing.

* * * * *